:::

United States Patent [19]

Miura et al.

[11] Patent Number: 5,900,468
[45] Date of Patent: May 4, 1999

[54] EPOXY RESIN COMPOSITION

[75] Inventors: Mareki Miura; Yoshinobu Ohnuma, both of Yokkaichi, Japan

[73] Assignee: Shell Oil Company, Houston, Tex.

[21] Appl. No.: 09/032,892

[22] Filed: Feb. 27, 1998

[30]  Foreign Application Priority Data

Mar. 3, 1997  [JP]  Japan .................................. 9-061711

[51] Int. Cl.[6] .................................................. C08F 283/00
[52] U.S. Cl. .............................. 525/481; 528/87; 528/96; 528/97
[58] Field of Search .............................. 525/481; 528/87, 528/96, 97

[56]   References Cited

U.S. PATENT DOCUMENTS

| | | | |
|---|---|---|---|
| 4,288,565 | 9/1981 | Lohse et al. ............................. | 525/481 |
| 4,759,978 | 7/1988 | Takata ...................................... | 528/98 |
| 4,835,240 | 5/1989 | Togashi et al. .......................... | 525/481 |
| 5,190,995 | 3/1993 | Shiobara et al. ........................ | 525/481 |

FOREIGN PATENT DOCUMENTS

| | | | |
|---|---|---|---|
| 62-201922 | 9/1987 | Japan ............................. | C08G 59/62 |
| 1-308422 | 6/1988 | Japan ....................................... | 528/99 |
| 6-312947 | 11/1994 | Japan . | |
| 7-17887 | 1/1995 | Japan ............................. | C07C 39/15 |
| 8-165872 | 6/1996 | Japan ............................. | E06B 11/06 |
| 8-177996 | 7/1996 | Japan ............................. | F16H 9/00 |
| 8-198793 | 8/1996 | Japan . | |

OTHER PUBLICATIONS

U.S. application No. 08/889,605, Miura et al., filed Jul. 8, 1997.
U.S. application No. 08/883,505, Miura et al., filed Jun. 26, 1997.

*Primary Examiner*—Randy Gulakowski

[57]   ABSTRACT

The epoxy resin composition which comprises both components (A) an epoxy compound having at least two epoxy groups in a molecule and (B) a polyphenol compound containing a trisphenol compound represented by general formula (I) described below

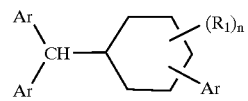

(I)

in which $R_1$ is a methyl group, n is an integer of 0 to 2, and Ar is a group selected from

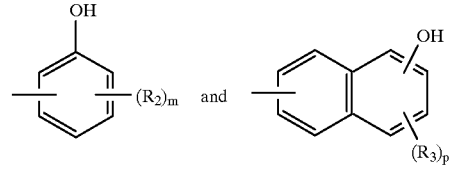

in which $R_2$ and $R_3$ are each individually selected from an alkyl group having a carbon number of 1 to 6, an alkoxy group having a carbon number of 1 to 6, or a halogen atom, and m and p are an integer of 0 to 2.

6 Claims, No Drawings

EPOXY RESIN COMPOSITION

FIELD OF THE INVENTION

The present invention relates to an epoxy resin composition which is useful as a material for encapsulation, resin for lamination board, casting material, molding material, resin for coating, and electric insulating material, and can provide a cured product having an excellent heat resistance and moisture resistance.

BACKGROUND OF THE INVENTION

Recently, scientific technologies rapidly progress around electronic industries, and particularly in semiconductor field, fine wiring and thinning of chips are made progress with a high integration of memory, whereby the mounting method is shifted to a surface-mounting. In an automated line for the surface mounting, there are problems that since packaged semiconductors suffer a sudden temperature change when leading wire is soldered, cracks occur in a resin molding product, or a boundary layer between the leading wires and the resin deteriorates, resulting in lowering a moisture resistance in semiconductor packages.

Therefore, as one of materials to be employed for the semiconductors, a curing agent for epoxy resins having an excellent heat resistance and moisture resistance has come to be used. For example, as a phenol-based curing agent having a moisture resistance, a dicyclopentadiene-modified phenol resin is proposed (Japanese Unexamined Patent Publication No. Sho 62-201922).

However, although the above-mentioned dicyclopentadiene-modified product is excellent in a moisture resistance, it has a defect that heat resistance cannot be satisfactorily obtained because of a low crosslinking density thereof.

Further, there is proposed a method (Japanese Unexamined Patent Publication No. Hei 7-17887) in which phenol resins obtained by a reaction of a specified diene or triene with phenols are used as a curing agent for epoxy resins. However, although heat resistance is improved in these methods, there are defects that the moisture resistance decrease in a cured product and the viscosity increases in an epoxy resin composition, with a result that workability lowers, high content filler loading becomes difficult, and cracks readily occur in a molded resin product due to increase in water absorption.

SUMMARY OF THE INVENTION

An object of the present invention is to provide a novel curable epoxy resin composition having well-balanced excellent heat resistance and moisture resistance and, further, which has an excellent workability because of low viscosity.

As a result of an intensive study in view of the above circumstances, the present inventors have found that the above-mentioned problems can be solved by mixing (A) an epoxy resin with (B) a polyphenol compound containing a specified trisphenol compound. The present invention has been made according to this finding.

That is, an epoxy resin composition in a first present invention is an epoxy resin composition characterized by essentially containing both components (A): an epoxy compound having at least two epoxy groups in a molecule and, (B): a polyphenol compound containing a specified trisphenol compound represented by the following general formula (I)

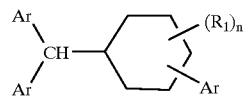

(I)

(in the formula, $R_1$ is a methyl group, n is an integer of 0 to 2, and Ar is a group selected from general formula IIA and general formula IIB:

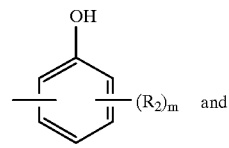

(IIA)

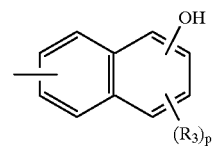

(IIB)

(in the formula, $R_2$ and $R_3$ are an alkyl group having a carbon number of 1 to 6, an alkoxy group having a carbon number of 1 to 6, or a halogen atom, m and p are an integer of 0 to 2)).

Further, a second present invention is an epoxy resin composition as set forth in the first invention, wherein the polyphenol compound which is the component (B) contains 5 to 100% by weight, preferably 10 to 90% by weight of the trisphenol compound represented by the above-mentioned general formula (I).

Still further, a third present invention is an epoxy resin composition as set forth in the first or second invention, wherein the polyphenol compound which is the component (B) contains 10 to 90% by weight of oligomer components of the trisphenol compound represented by the above-mentioned general formula (I).

Yet further, a fourth present invention is an epoxy resin composition as set forth in the first, second, or third invention, wherein the component (B) is mixed with the component (A) in a mixing ratio of 0.5 to 2.0 equivalent of hydroxyl group in said polyphenol compound which is the component (B) with respect to 1 equivalent of epoxy groups in the above-mentioned epoxy resin which is the component (A).

Besides, a fifth present invention is an epoxy resin composition as set forth in the first to fourth inventions, wherein a curing accelerator is mixed with the epoxy resin composition in a weight ratio of preferably 0.1 to 5.0 parts by weight based on 100 parts by weight of the epoxy resin as an essential component.

Also, a sixth present invention is an epoxy resin composition for encapsulation, wherein a curing accelerator and inorganic filler are mixed with the epoxy resin composition containing the above-mentioned components (A) and (B) as set forth in the first to third inventions.

DETAILED DESCRIPTION OF THE PRESENT INVENTION

An epoxy resin having at least two epoxy groups in a molecule to be employed as the component (A) in the present invention includes, for example, a bisphenol type epoxy resin such as diglycidylether of bisphenol A and diglycidylether of bisphenol F, a biphenol type epoxy resin, a phenol-novolak epoxy resin, a cresol-novolak epoxy resin, a glycidyl amine compound obtained from an aminophenol or diaminodiphenyl methane, etc., a glycidyl ester compound obtained from phthalic acid or hexahydrophthalic acid, etc., an aliphatic glycidylether obtained from 1,4-butanediol or 1,6-hexanediol, etc., a cycloaliphatic epoxy resin obtained from a hydrogenated bisphenol A and dicyclopentadiene, etc., a brominated epoxy resin obtained from a brominated bisphenol A, or a brominated phenol, etc., and a multi-functional epoxy resin, etc. obtained from trishydroxphenylmethane, ect.

A polyphenol compound containing a specific trisphenol compound represented by the above-mentioned general formula (I) to be employed as the component (B) in the present invention can be obtained by a reaction of a cycloaliphatic unsaturated aldehyde represented by the following general formula (III) with phenols having a carbon number of 6 to 20 in the presence of an acidic catalyst. A detailed process for the preparation of the polyphenol compound is described in Japanese Unexamined Patent Publication No. Hei 8-165872.

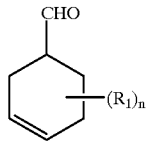

(III)

(in the formula, $R_1$ and n are the same as above)

The polyphenol compound contains, for example, oligomer components of a trisphenol compound represented by general formula (IV) described below other than the trisphenol compound.

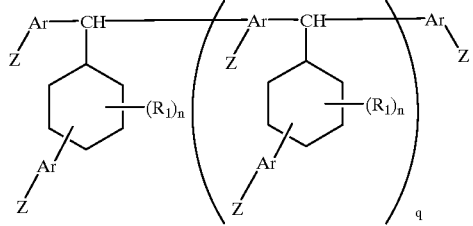

(IV)

(in the formula, $R_1$, Ar, and n are the same as above, q is an integer of 1 to 5, and Z is a hydrogen atom and a group selected from general formula (V))

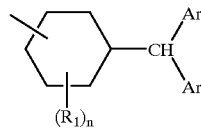

(V)

(in the formula, $R_1$, Ar, and n are the same as above)).

The amount ratio of the trisphenol compound with respect to the oligomer of the trisphenol compound in the polyphenol compound can be freely adjusted by controlling feeding ratio of the cycloaliphatic unsaturated aldehyde represented by the above-mentioned general formula III with respect to the phenols having a carbon number of 6 to 20. In the amount ratio of the trisphenol compound with respect to the oligomer components, the trisphenol compound generally ranges from 5 to 100% by weight, and preferably from 10 to 90% by weight.

In the case that the trisphenol is less than 5% by weight, viscosity increases in the epoxy resin composition, unpreferably resulting in causing problems that mixing of a large amount of fillers become difficult, and cracks readily occur in a molded resin product.

The mixing ratio of the above-mentioned components (A) to (B) ranges in a ratio of 0.5 to 2.0 equivalent of hydroxyl group in the polyphenol compound which is the component (B) with respect to 1 equivalent of an epoxy group in the epoxy resin which is the component (A). The polyphenol compound which is the component (B) acts as a curing agent for the above-mentioned epoxy resin which is the component (A), and a curing accelerator may be mixed in the epoxy resin composition of the present invention for the purpose of accelerating the curing reaction.

For example, there are exemplified phosphine compounds such as tributyl phosphine, triphenyl phosphine, and tris (dimethoxy)phosphine, phosphonium salts such as tetraphenylphosphoniumchloride, tetrabutylphosphoniumbromide, ethyltriphenyl phosphonium iodide, tetraphenylphosphoniumtetraphenylborate, methyltributyl phosphonium tetraphenylborate,and methyltricyanoethylphosphonium tetraphenylborate,imidazoles such as 2-methylimidazole, 2-phenylimidazole, 2-ethyl-4-methyl imidazole, and salts thereof, tertiary amines such as 2,4,6-tris(dimethylaminomethyl)phenol, benzyldimethylamine, 1,4-diazabicyclo(2,2,2)-octane, 1,5-diazabicyclo(5,4,0)-undecane, and salts thereof, quaternary ammonium salts such as tetramethylammonium chloride, tetrabutylammoniumbromide, and tetrabutylammoniumiodide.

The curing accelerator is preferably mixed in a mixing ratio ranging from 0.1 to 5.0 parts by weight based on 100 parts by weight of the epoxy resin. In the case that the mixing ratio of the curing accelerator is less than 0.1 part by weight, the curing reaction becomes slow, and the effect by mixing the curing accelerator decreases. Further, in the case that it exceeds 5.0 parts by weight, moisture resistance becomes unpreferably poor in a cured product obtained.

Still further, in the case of employing the epoxy resin composition of the present invention for the purpose of encapsulating semiconductors, inorganic fillers such as finely powdered silica, fused silica, crystalline silica, and powdered glass may be mixed.

Mixing amount of the inorganic fillers is 60 to 95% by weight, preferably 70 to 93% by weight based on the total weight of the composition.

In the epoxy resin composition of the present invention, the following components may be optionally mixed as additives: (1) powdered reinforcing materials and fillers, for example, metal oxides such as aluminum oxide and magnesium oxide, metallic carbonates such as calcium carbonate and magnesium carbonate, silicone compounds such as powdered diatomaceous earth, a basic magnesium silicate, and calcined clays, metal hydroxides such as aluminum hydroxide, and kaoline, mica, powdered quartz, graphite, molybdenum disulfide, and further, fibrous reinforcing materials and fillers, for example, fiberglass, ceramic fibers, carbon fibers, alumina fibers, silicone carbide fibers, boron fibers, polyester fibers and polyamide fibers. (2) coloring agents, pigments, flame retardants, for example, titanium dioxide, Iron Black, Molybdenum Red, Navy Blue, Ultramarine Blue, Cadmium Yellow, Cadmium Red, antimony trioxide, red phosphorus, halogenated compounds, and triphenylphosphate,etc. (3) Further, a variety of curable monomers and oligomers, and synthetic resins may be mixed for the purpose of improving properties of resins in final coating layers, adhesive layers, and molded products, etc. For example, there are exemplified one or more kinds of diluents for epoxy resins such as monoepoxides, phenol resins, alkyd resins, melamine resins, fluorocarbon resins, polyvinyl chloride resins, acrylic resins, silicone resins, polyester resins. Mixing ratio of the resins is a range in which there are not deteriorated inherent properties in the resin composition of the present invention, that is, it is preferably less than 50% by weight based on the total resins.

As a means for mixing the (A), (B), and other components in the present invention, there are exemplified a melt mixing method while heating, a melt kneading method by a roll or a kneader, a wet mixing method with an appropriate solvent and a dry blend method, etc.

EXAMPLES

Hereinafter, the present invention is further illustrated in detail by examples which are included for illustrative purposes only and are in no way meant to limit the present invention. It is to be noted that "part" in the Examples means "part by weight". A polyphenol compound (1) and a polyphenol compound (2) employed in respective Examples and Comparative Examples are as follows.

Preparation of a polyphenol compound (1):

A 1-liter four-necked flask equipped with a thermometer, an agitator, and a condenser was charged with 564 g (6 mol) of phenol, 44 g (0.4 mol) of 3-cyclohexene-1-carbaldehyde, and 4.4 g of silicotungstic acid, followed by carrying out a reaction at 80° C. for 7 hours. After the completion of the reaction, silicotungstic acid was neutralized by adding 1.8 g of 24%-sodium hydroxide, and then unreacted phenol was distilled out with a rotary evaporator at bath temperature of 160° C. under reduced pressure.

Subsequently, after 400 g of methylisobutyl ketone was added in the flask to dissolve, a product was thrice washed with 300 g of pure water to remove inorganic substances.

After washing with water, methylisobutyl ketone was distilled out at 100 to 160 C. under reduced pressure to obtain 129 g of a polyphenol compound (a mixture composed of 70% of trisphenol compound and 30% of oligomer components thereof) which is a brownish and glassy solid.

Preparation of a polyphenol compound (2):

According to the process for preparation of the polyphenol compound (1), a polyphenol compound (composed of 76.3% of trisphenol compound and 23.7% of oligomer components thereof) was prepared by a reaction of α-naphthol (6 mol) with 3-cyclohexene-1carbaldehyde (0.4 mol) in the presence of silicotungstic acid which is a catalyst.

Example 1

There were mixed 100 parts of an epoxy resin (a trade name: Epikote YX4000H manufactured by Yuka-Shell Epoxy, K.K.) prepared from tetramethylbiphenol and 83 parts of the polyphenol compound (1) at the temperature of 130° C. to prepare a mixture in which 1 equivalent of hydroxyl group in the polyphenol compound is mixed with 1 equivalent of an epoxy group in the epoxy resin. After removal of bubbles to prepare a homogeneous solution, 1 part of triphenylphosphine was added, followed by quickly mixing while agitating to obtain a composition.

Subsequently, the above-mentioned composition was cast into a mold, followed by curing at 180° C. for 7.5 hours in an oven to obtain a cured product. The physical properties of the cured product are shown in Table 1.

Example 2

The same operations were followed as in the Example 1, except that the polyphenol compound was changed to 110 parts of the polyphenol compound (2) to obtain a composition, and then a cured product. The physical properties of the cured product are shown in Table 1.

Comparative Example 1

The same operations were followed as in the Example 1, except that the polyphenol compound (1) was changed to 110 parts of a dicyclopentadiene-modifiedphenol resin (DPP-3H manufactured by Nippon Oil Co., Ltd.) to obtain a composition, and then a cured product. The physical properties of the cured product are shown in Table 1.

Comparative Example 2

The same operations were followed as in the Example 1, except that the polyphenol compound (1) was changed to 55 parts of a phenol-novolakresin to obtain a composition, and then a cured product. The physical properties of the cured product are shown in Table 1.

Example 3

There were mixed 100 parts of a cresol-novolak epoxy resin (a trade name: Epikote 180H65 manufactured by Yuka-Shell Epoxy, K.K.), 78 parts of the polyphenol compound (1), a brominated phenol-novolak, antimony trioxide, an epoxysilane, carnauba wax, and crushed-type fused silica at the temperature of 130 C. for 10 minutes with a mixing roll, followed by adding triphenyl phosphine and further by mixing for 3 minutes to obtain a composition. The composition obtained was taken out as a sheet, followed by crushing to obtain a material for molding.

Subsequently, the above-mentioned material for molding was molded in mold temperature of 175° C. and molding time of 180 seconds with a low pressure transfer molding machine, followed by curing for 7.5 hours in an oven to obtain a cured product.

The physical properties of the cured product are shown in Table 2.

Example 4

The same operations were followed as in the Example 3, except that the polyphenol compound was changed to 103 parts of the polyphenol compound (2) to obtain a composition, and then a cured. product. The physical properties of the cured product are shown in Table 2.

Comparative Example 3

The same operations were followed as in the Example 3, except that the polyphenol compound (1) was changed to 50 parts of a phenol resin (YL6065 manufactured by Yuka Shell Epoxy, K.K.) prepared from phenol and salicylic aldehyde to obtain a composition, and then a cured product. The physical properties of the cured product are shown in Table 2.

TABLE 1

| | Example 1 | Example 2 | Comparative Example 1 | Comparative Example 2 |
|---|---|---|---|---|
| Epoxy resin | YX4000H (100) | same as the left | same as the left | same as the left |
| Polyphenol compound | Polyphenol (1) (83) | Polyphenol (2) (110) | Dicyclopentadiene polyphenol (100) | Phenol-novolak resin (54) |
| Curing Accelerator | Triphenylphosphine (1) | same as the left | same as the left | same as the left |
| Viscosity of a composition *1 | 0.8 | 1.4 | 1.1 | 1.3 |
| Glass transition temperature *2 (° C.) | 154 | 166 | 135 | 132 |
| Moisture absorption ratio *3 (%) | 1.03 | 0.92 | 1.05 | 1.36 |

*1 150° C., ICI viscometer
*2 TMA method
*3 Water absorption ratio at 85° C., 85% after 168 hours

TABLE 2

| | Example 3 | Example 4 | Comparative Example 3 |
|---|---|---|---|
| Epoxy resin | E180H65 | same as the left | same as the left |
| Polyphenol compound (part by weight) | Polyphenol (1) (78) | Polyphenol (2) (103) | Phenol salicylic aldehyde novolak (50) |
| Curing accelerator | Triphenylphosphine (1) | same as the left | same as the left |
| Powdered silica *1 | 469 | 527 | 404 |
| Brominated epoxy *2 | 10 | 10 | 10 |
| Antimony trioxide | 10 | 10 | 10 |
| Calnaubawax | 1 | 1 | 1 |
| Epoxy silane *3 | 1 | 1 | 1 |
| Glass transition temperature *4 (° C.) | 172 | 180 | 171 |
| Absorption ratio of moisture *5 (%) | 0.52 | 0.46 | 0.73 |

*1: Crushed-type fused silica (RD-8, a trade name by Tatsumori, Ltd.)
*2: Brominated phenol-novolak epoxy resin (BREN, a trade name by Nihon Kayaku, Co. Ltd.)
*3: Silane coupling agent (KBN-403, a trade name by Shin-Etsu Chemical Co. Ltd.)
*4: TMA method
*5: Water absorption ratio at 85° C., 85% after 168 hours The epoxy resin composition of the present invention can provide a cured product having a well-balanced heat resistance and moisture resistance. Therefore, it can be utilized and developed in a wide range of uses, particularly, it can be advantageously employed in a use of an encapsulant for semiconductors.

What is claimed is:

1. The epoxy resin composition containing both components (A) an epoxy resin having at least two epoxy groups in a molecule and (B) a polyphenol compound containing a trisphenol compound of the formula (I):

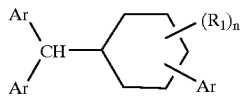

(I)

wherein $R_1$ is a methyl group, n is an integer of 0 to 2, and Ar is a group selected from

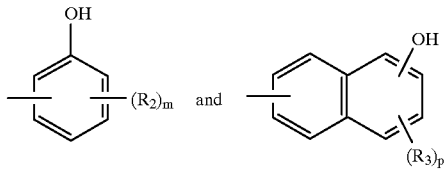

wherein $R_2$ and $R_3$ are each independently selected from an alkyl group having a carbon number of from 1 to 6, an alkoxy group having a carbon number of from 1 to 6, and a halogen atom, and m and p are each individually an integer of 0 to 2.

2. The epoxy resin composition of claim 1, wherein said polyphenol compound which is the component (B) contains 5 to 100% by weight of said trisphenol compound represented by formula (I).

3. The epoxy resin composition of claim 1, wherein said polyphenol compound which is the component (B) contains 10 to 90% by weight of oligomer components of said trisphenol compound represented by formula (I).

4. The epoxy resin composition of claim 1 wherein the component (B) is mixed with the component (A) in a mixing ratio of 0.5 to 2.0 equivalent of hydroxyl group in said polyphenol compound which is the component (B) with respect to 1 equivalent of epoxy groups in the above-mentioned epoxy resin which is the component (A).

5. The epoxy resin composition of claim 1, wherein a curing accelerator is mixed with epoxy resin composition containing said component (A) and component (B).

6. A epoxy resin composition for encapsulation, wherein a curing accelerator and inorganic filler are mixed with the epoxy resin composition as claimed in claim 1.

* * * * *